US006999195B2

(12) United States Patent
Johnson

(10) Patent No.: US 6,999,195 B2
(45) Date of Patent: Feb. 14, 2006

(54) DIGITAL IMAGING DEVICE

(75) Inventor: Bruce K. Johnson, Elkins, NH (US)

(73) Assignee: Polaroid Corporation, Waltham, MA (US)

( * ) Notice: Subject to any disclaimer, the term of this patent is extended or adjusted under 35 U.S.C. 154(b) by 904 days.

(21) Appl. No.: 09/748,586

(22) Filed: Dec. 22, 2000

(65) Prior Publication Data

US 2002/0080226 A1 Jun. 27, 2002

(51) Int. Cl.
*G06K 15/00* (2006.01)

(52) U.S. Cl. ........................................ 358/1.2; 358/414

(58) Field of Classification Search ................. 358/1.2, 358/1.3, 501, 504, 532, 414, 471, 484
See application file for complete search history.

(56) References Cited

U.S. PATENT DOCUMENTS 4,487,482 A * 12/1984 Itoh et al. .................... 359/699
4,790,632 A * 12/1988 Miyakawa et al. ........... 349/95
4,928,118 A * 5/1990 Leksell et al. .............. 347/241
6,678,074 B1 * 1/2004 Huang ........................ 358/474
2002/0080226 A1 * 6/2002 Johnson ...................... 347/233
2002/0080243 A1 * 6/2002 Whiteside et al. .......... 348/218

FOREIGN PATENT DOCUMENTS

JP 06078338 * 3/1994
JP 8-271875 * 10/1996

* cited by examiner

*Primary Examiner*—Jerome Grant, II

(57) ABSTRACT

The present invention is an inexpensive and accurate means of improving resolution when imaging a small digital display onto a larger photosensitive medium. The device includes a printer having a housing that encloses, in a common cavity thereof, an arrangement comprising a digital area array display, a plurality of lenses, and an image plane. The digital area array display, the plurality of lenses, and the image plane are spaced along an optical axis extending from the digital area array display through the plurality of lenses, and toward the image plane such that a digital image provided by the display can be brought into focus onto the imaging plane by the plurality of lenses. One of the plurality of lenses is a transposable lens, the transposable lens capable of being transposed out of the optical axis during the operation of the printer, to increase the perceived resolution of the digital image focused onto the imaging plane. The invention provides in another aspect, a jogging mechanism for jogging a lens, the device comprising a first translating means for jogging an transposable lens in a first direction, a second translating means for jogging the transposable lens in a second direction, and a biasing means. In an alternate aspect, the present invention also provides a method of imaging a digital display onto an image plane, whereby the method of imaging increases the perceived resolution of the digital image focused onto said imaging plane.

11 Claims, 5 Drawing Sheets

DIGITAL IMAGING DEVICE

BACKGROUND

1. The Field of the Invention

In general, the present invention relates to digital image devices, and more particularly, to a novel means for improving resolution of an image projected from a digital display.

2. Description of the Prior Art

The internet is dramatically changing the way information is created and distributed. The increasing popularity of this world wide network has led to many new digital products used for a variety of purposes. For example, digital cameras capture images and store them as digital files which may be easily published on a website or instantly sent across the world.

Digital files may also be viewed or imaged using various digital displays, such as microdisplays, spatial light modulators, liquid crystal displays (LCD), organic light emitting diode displays (OLED), or other known types of digital displays. Digital displays are comprised of arrays of pixels which illuminate at various discrete levels. Improving the resolution of the image on the digital display may be obtained by increasing the number of pixels per unit area. Pixels per unit area may also be referred to as dots per inch (dpi). As you increase the dots per inch and/or size of the digital display, the cost of the device increases. Therefore, a product designer using a digital display must balance the need for a high quality image and also the consumer's desire for low priced products.

A digital display with a fixed pattern and number of pixels such as a 600×800, or a 480,000 pixel display may be projected onto a screen for viewing with good results. However, this resolution, or pixel count, may not be high enough to satisfy demanding applications, such as printing on large format film. When printing a digital display's image onto large formats, the pixels may become noticeable and the image will have the "jaggies" or the "staircase effect". An illustration of this effect is, for example, the imaged letter "O" will appear to have jagged edges and not the smooth rounded edges as desired.

One proposed method for improving image resolution when using a digital display is to use a display with a higher resolution. A display's resolution is increased by having more pixels per unit area or dots per inch (dpi). However, displays become very expensive as you increase their size and/or resolution, which would then drive up the price of the finished product.

Thus, a need exists for an inexpensive means of improving resolution when imaging a digital display onto a larger photosensitive medium.

SUMMARY

The present invention is directed to a digital image printer which incorporates a jogging system for providing an inexpensive and accurate means for improving resolution when imaging from a digital display.

Accordingly, the invention provides in one aspect a printer having a housing that encloses, in a common cavity thereof, an arrangement comprising a digital area array display, a plurality of lenses, and an image plane onto which a photosensitive medium may be superposed. The digital area array display, the plurality of lenses, and the image plane are spaced along an optical axis extending from the digital area array display through the plurality of lenses, and toward the image plane such that a digital image provided by the display can be brought into focus onto the imaging plane by the plurality of lenses. One of the plurality of lenses is a transposable lens, the transposable lens capable of being transposed out of the optical axis during the operation of the printer, to increase the perceived resolution of the digital image focused onto the imaging plane.

In another embodiment, the invention also includes a device for transposing a transposable lens, the device comprising a first translating means for transposing a transposable lens in a first direction, and a second translating means for transposing a transposable lens in a second direction.

Also, a biasing means having a biasing means first end and biasing means second end, the biasing means being fixed at the biasing means first end, the biasing means second end being attached to the transposable lens.

The present invention provides, in another aspect, a method of imaging a digital display onto an image plane, the method comprising the steps of: a) providing a digital display, a plurality of lenses, and an image plane onto which a photosensitive medium may be superposed, the digital display, the plurality of lenses, and the image plane are spaced along an optical axis extending from the digital display through the plurality of lenses, and toward the image plane such that a digital image provided by the display can be brought into focus onto the imaging plane by the plurality of lenses, and one of the plurality of lenses is a transposable lens, the transposable lens capable of being transposed out of the optical axis during the operation of the printer; b) illuminating the digital display with a first digital image data set for a fixed period of time, turning off the digital display; c) transposing the transposable lens a fixed distance, in a first direction; and d) illuminating the digital display for a second fixed period of time, using a second digital image data set, turning off the digital display; and e) whereby the method of imaging increases the perceived resolution of the digital image focused onto the imaging plane.

BRIEF DESCRIPTION OF THE DRAWINGS

The above and other features and advantages of this invention will be more readily apparent from a reading of the following detailed description of various aspects of the invention taken in conjunction with the accompanying drawings. The relative locations, shapes and sizes of objects have been exaggerated to facilitate discussion and presentation herein.

DETAILED DESCRIPTION OF THE PREFERRED EMBODIMENTS

Referring to the figures set forth in the accompanying drawings, the illustrative embodiments of the present invention will be described in detail hereinbelow.

The present invention is a digital image printer which incorporates a jogging system for providing an inexpensive and accurate means for improving resolution when imaging from a digital display 12.

Figure 1:
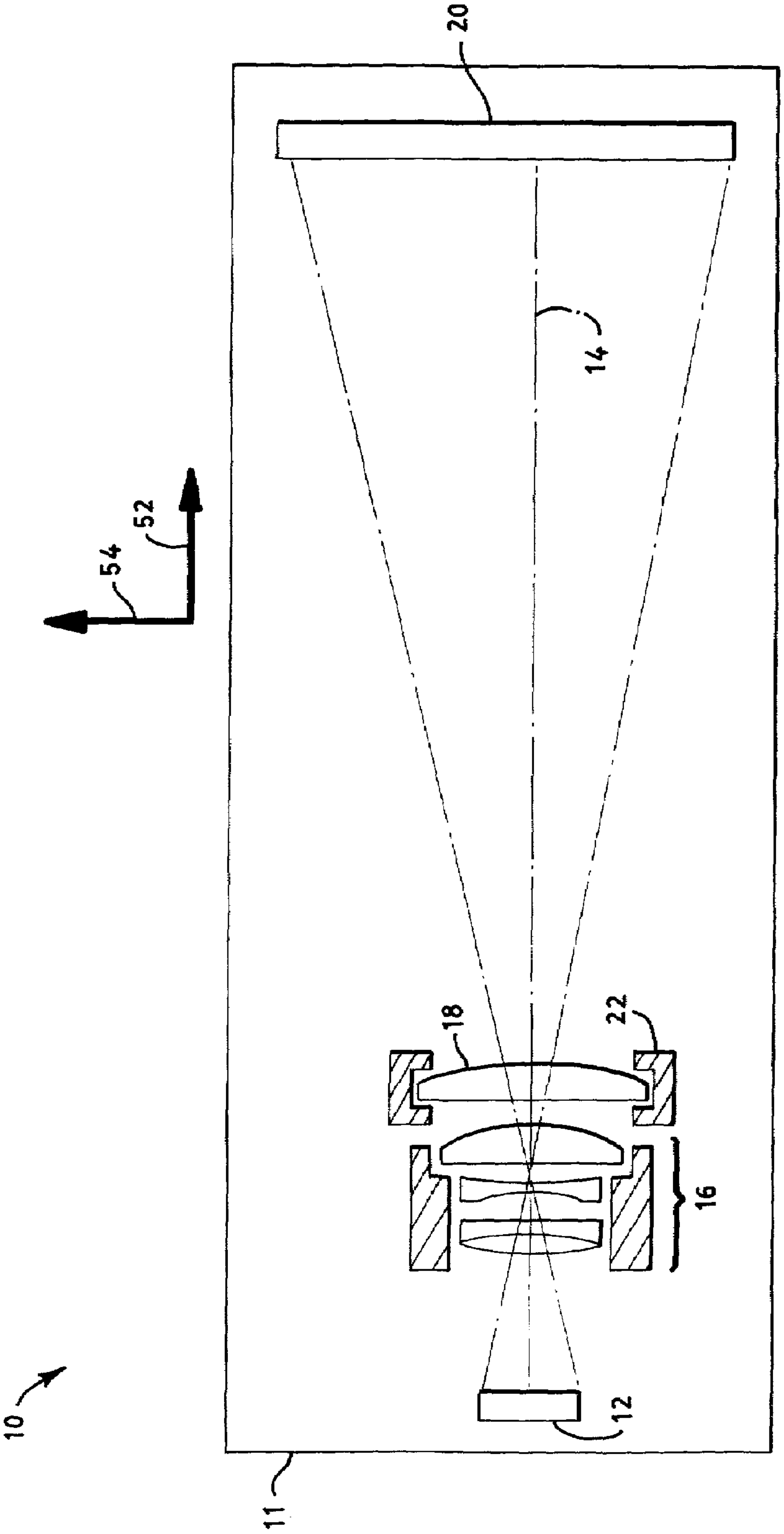
FIG. 1 is a cross-sectional schematic view of an embodiment of the digital image printer of the present invention.

Referring to the FIG. 1, the digital printer 10 of the present invention is shown, in a first embodiment, to comprise a housing 11 that encloses, in a common cavity thereof, a digital area array display, or digital display 12, which may be located at one end of said housing 11. A first lens 16, and a transposable lens 18 are also located in the housing 11. The first lens 16 and transposable lens 18 being fixed along an optical axis 14 extending from said digital display 12, through a plurality of lenses, and ending on an image plane 20. The lenses are located between said digital display 12 and said image plane 20.

The digital display 20 may be a spatial light modulator, a liquid crystal display (LCD), an organic light emitting diode (OLED), a microdisplay, or other digital area array display known in the art. In a first embodiment, the digital display 12 is a microdisplay, which is a digital display under 1.5 inches diagonal that requires magnification or projection for proper viewing. This jogging method may be used on either a transmissive or reflective type digital display. Transmissive displays have low fill factors because they require more structure around each pixel than reflective displays. The quality of an image produced from a digital display typically decreases as the fill factor of the digital display decreases. The lower the fill factor, the lower the amount of area of the display that will transmit light. One of the advantages of the instant invention, is the jogging system reduces some of these problems associated with digital displays having low fill factors. Whether the display is transmissive or reflective, it should be firmly fixed so that the digital display face is substantially parallel to the image plane 20.

A first lens 16 is also included in the digital printer 10. This lens's function is for projecting the digital display image onto the image plane 20. This first lens 16 is permanently fixed in a position to properly focus the digital display image onto the image plane 20. Any conventional prime imaging lens may be used for this purpose, for example, an optical projection lens. The first lens 16 is configured to be fixed in a position substantially parallel to the digital display 12, the transposable lens 18 and the image plane 20. Either plastic or glass lenses may be used in this application. Alternatively, this first lens 16 could be a group of lenses assembled as a prime imaging lens for the printer 10.

A transposable lens 18 is also included in the digital printer 10. This transposable lens 18 is part of the jogging system. The transposable lens 18 is coupled with a device to "jog", or transpose, the transposable lens 18 in planer directions substantially perpendicular to the optical axis 14. This system of jogging increases the resolution of the printed image which will be described in more detail, hereinafter with the discussion of FIG. 4. Any conventional lens may be used for this purpose, for example, a meniscus or plano-convex lens. The first lens 16 is the prime imaging lens and has a higher diopter power than the transposable lens 18. In a first embodiment, the first lens 16 has approximately 20 to 40 times more diopter power than the transposable lens 18. For example, if the first lens 16 has a diopter power of 40, then the transposable lens 18 may have a diopter power of only 1 or 2.

The transposable lens 18 may be placed before or after the first lens 16. In a first embodiment, the transposable lens 18 is located in between the first lens 16 and the image plane 20. The first lens 16 may be adjusted to allow for the axial refocus of the projected image that results from placing the weak transposable lens 18 between the first lens 16 and the image plane 20. In a first embodiment, the system of jogging the transposable lens 18, being 1000 mm, in conjunction with the fixed first lens 16, being 35 mm, de-amplifies the effect of the jog such that the mechanical tolerances required on the jogging device become easy to control. For example, in one embodiment, a lateral lens move of 150 microns, or 0.006 inches, would require a first lever 28 to move 0.040 inches at the first end 26 of the first lever 28. The linear motion control device 24 in conjunction with various stops in the device 22 function to accurately and repeatably move the transposable lens 18 0.006 inches. Optical analysis shows that the entire image plane 20 is also moved precisely 0.006 inches, or if there is distortion in the image, each pixel is moved the same fraction of a pixel, the desired amount being half a pixel. This weak transposable lens 18 has negligible effect on the optical quality of the image, even if the first lens 16 is designed without including the effects on the image of the weak transposable lens 18. Alternatively, if the transposable lens 18 and the first lens 16 both had a focal length of 35mm, then even small jogs of the transposable lens 18 would cause large shifts of the image, and therefore requiring small tolerances on the movements of the jogging device.

Figure 2:
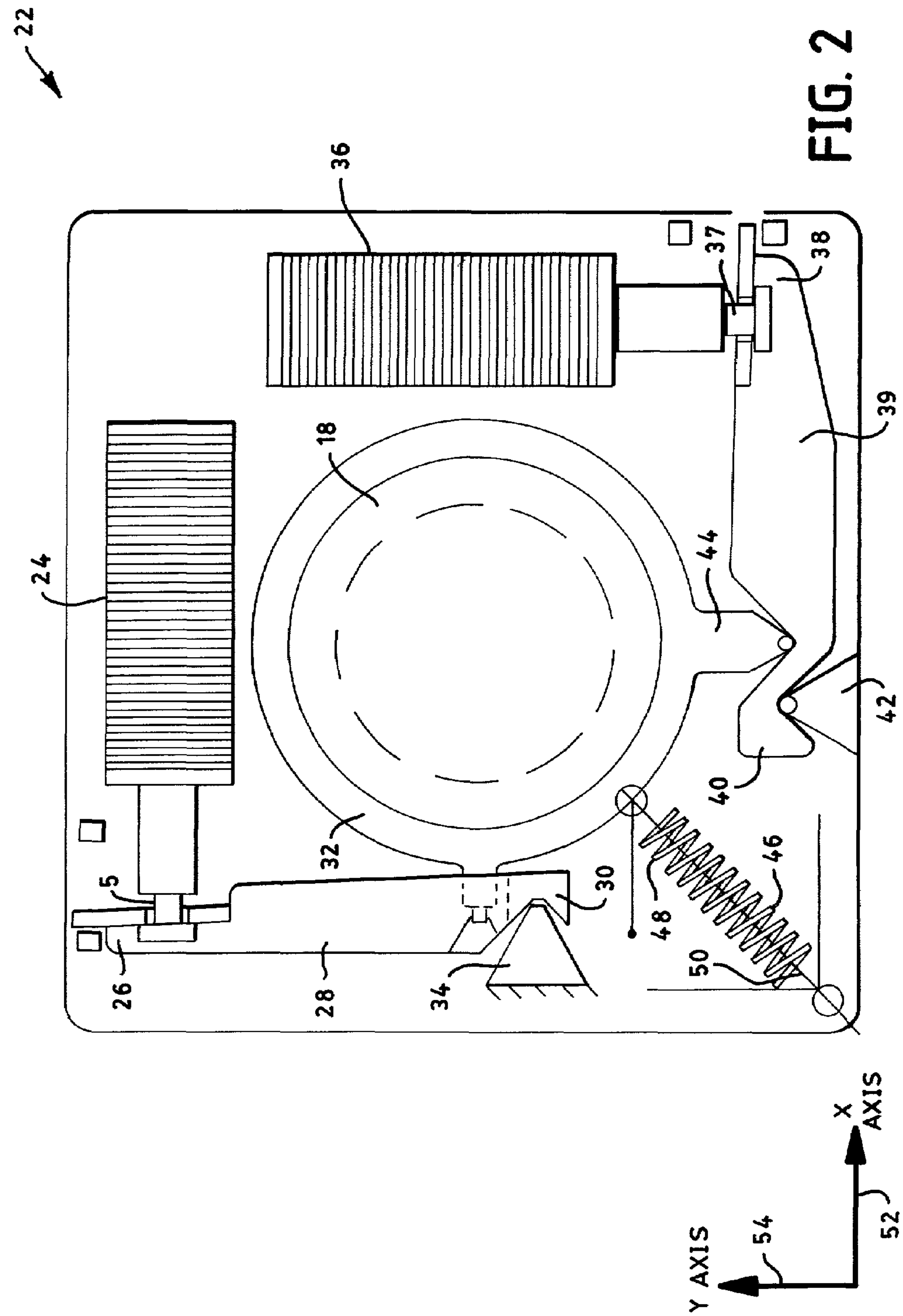
FIG. 2 is a side elevational view of an embodiment of the device of said digital image printer illustrated in FIG. 1.

The image plane 20 is located substantially parallel to the digital display 12. The first lens 16 is the prime imaging lens that projects the digital image onto the image plane 20. A photosensitive medium, such as conventional or instant film, may be used to define the image plane 20 and for capturing the image. In the first embodiment, the image plane 20 is defined by one piece of instant film. A first embodiment of a device 22, is illustrated in FIG. 2, which functions to transpose, or "jog", the transposable lens 18 in various planer directions. A linear motion control device 24 is coupled at its moving end 25, to a first end 26 of a first lever 28. The linear motion device 24 may be a solenoid or other similar device. The first lever 28 also has a second end 30 which pivots against a first fixed support 34. The second end 30 is also disposed with a transposable lens frame 32 which secures said transposable lens 18 on its perimeter. The second end 30 may either be attached or merely circumjacent to the transposable lens frame 32. Movement of the linear motion control device 24 forces the first lever 28 to pivot, and therefore, move the transposable lens frame 32 and transposable lens 18 in either a positive or negative x-axis direction 52. A biasing means 46, having a first end 50 and a second end 48, is permanently fixed at said first end 50. The second end 48 is attached to said transposable lens frame 32. The biasing means 46 is sized to provide a minimum amount of tension on said transposable lens 18 to aid in its movement from one jogged position to another.

The first embodiment of said device 22 also includes a second linear motion control device 36 being coupled at a second moving end 37, to a second lever first end 38 of a second lever 39. The second linear motion device 36 may be a solenoid or other similar device. The second lever 39 also has a second lever second end 40 which pivots against a second fixed support 42. The second lever second end 40 is also disposed with said transposable lens frame 32 at a different point than said first lever 28. The second end may either be attached or merely circumjacent to the transposable lens frame 32. Movement of the second linear motion control device 36 forces the second lever 39 to pivot, and therefore, move the transposable lens frame 32 and transposable lens 18 in either a positive or negative y-axis direction 54.

Figure 3:
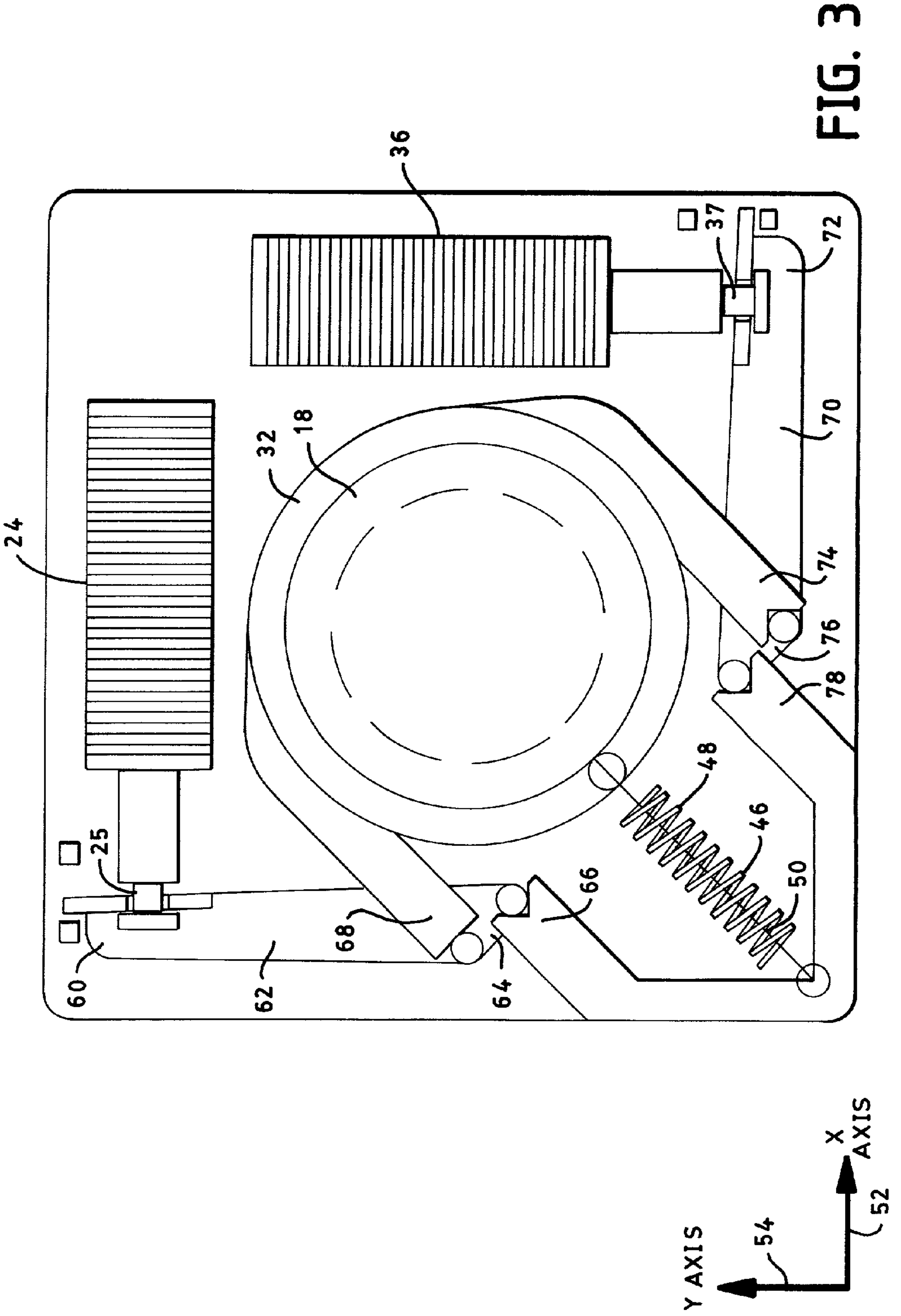
FIG. 3 is a side elevational view of a second embodiment of the device of said digital image printer illustrated in FIG. 1.

A second embodiment of the device 22, is illustrated in FIG. 3, which functions to shift or "jog" the transposable lens 18 in various planer directions. This second embodiment accomplishes the same function as the first embodiment but uses a different mechanism. A linear motion control device 24 is coupled at its moving end 25, to a first end of first member 60. The linear motion device 24 may be a solenoid or other similar device. The first member 62 also has a second end of first member 64 which pivots against a first support 66. The second end 30 of first member 64 is also disposed with a first frame member 68 which is disposed with the transposable lens frame 32. The transposable lens frame 32 secures said transposable lens 18 on its perimeter. Movement of the linear motion control device 24 forces the first member 62 to pivot, and therefore, move the transposable lens frame 32 and transposable lens 18. A biasing means 46, having a first end 50 and a second end 48, is permanently fixed at said first end 50. The second end 48 is attached to said transposable lens frame 32.

The second embodiment of said device 22 also includes a second linear motion control device 36 being coupled at a second moving end 37, to a first end of second member 72. The second linear motion device 36 may be a solenoid or other similar device. The second member 70 also has a second end of second member 76 which pivots against a second support 78. The second end of second member 76 is also disposed with said second frame member 74. Said second frame member 74 is coupled with the transposable lens frame 32. Movement of the second linear motion control device 36 forces the second member 70 to pivot, and therefore, move the transposable lens frame 32 and transposable lens 18. The controlled movements of the two linear motion control devices accurately moves the transposable lens 18 in any combination of the positive or negative x-axis 52 or y-axis 54 directions.

Figure 4:
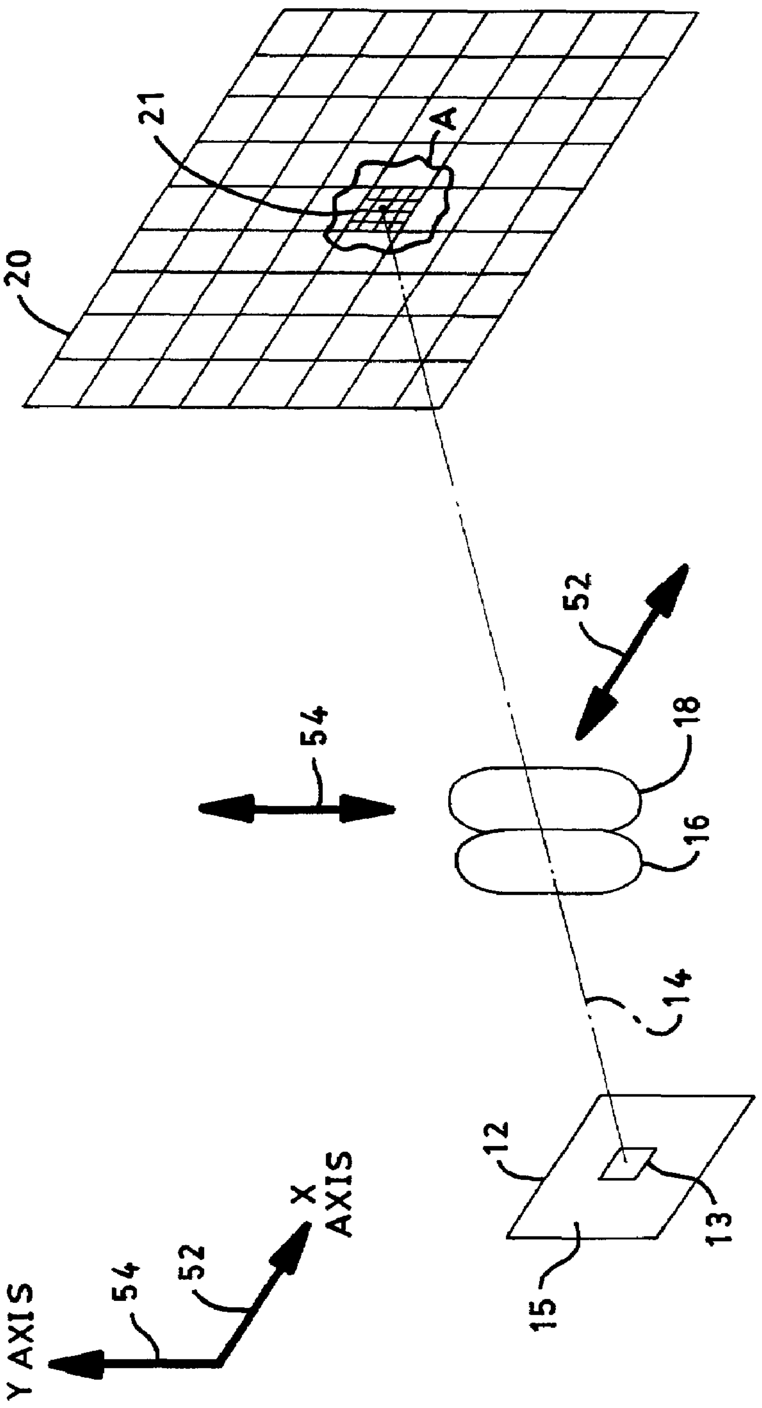
FIG. 4 is an exploded view, similar to that of FIG. 1, of parts of the digital image printer of the present invention.
Figure 5D:
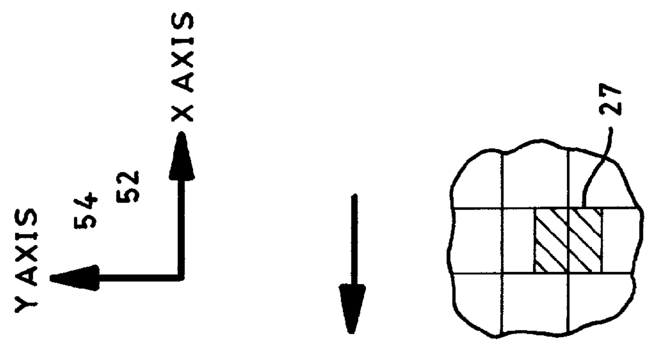
FIGS. 5A–D are partially broken away front elevational views, of said image plane of FIG. 4, illustrating the various image locations of one pixel from the digital display, as the single pixel image is jogged from one position to a next.
Figure 5C:
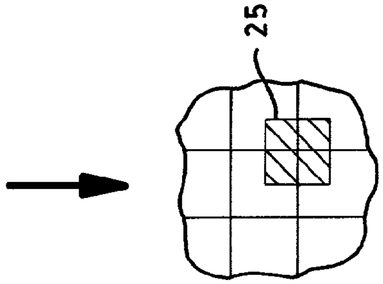
Figure 5B:
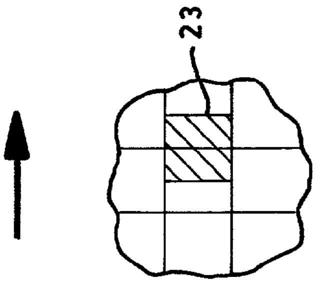
Figure 5A:
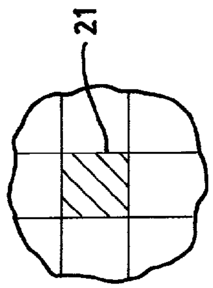

FIG. 4 shows another view of a digital image printer 10 which incorporates the jogging system of the instant invention. As known in the art, the face of a digital display 15 comprises an array of pixels. However, to clarify our discussion we will first discuss only one of the digital display's pixels. Therefore, one pixel 13 is shown on the face of the digital display 15. The light from said pixel 13 is projected along an optical axis 14 through the first lens 16 and transposable lens 18 and onto the image plane 20 at a first pixel imaged location 21. The image plane 20 is divided up into rows and columns to illustrate that the image on said image plane 20 is derived from the many rows and columns of pixels on the digital display 12. Also shown, as previously discussed, the transposable lens 18 may be jogged in various directions, such as the x-axis direction 52 and/or the y-axis direction 54.

In operation, conventional digital printers typically illuminate a digital display 12 and optically project the image onto a photosensitive medium for printing. However, the instant invention projects the image onto a photosensitive medium for only part of the total exposure time of the medium. Then, the transposable lens 18 is jogged at least once, and the image is exposed onto the photosensitive medium again. For each separate jogged position, each pixel of the digital display 12 is refreshed with a distinct image sub-file, each being comprised of red, green and blue data. The jogging system may be designed to have two, three, four or more jogged positions for a full exposure, depending on the desired resolution.

The exposure time and illumination rates will vary depending on which type of digital display is used in the system. For example, if you have a digital display with 25% fill factor, each pixel or jog position requires full exposure at full illumination. Alternatively, if the digital display 12 has 100% fill factor, then each pixel or jog position requires ¼ exposure time at full illumination, or full exposure time at ¼ illumination. A digital display with 100% fill factor gives you four times as much light as a digital display with a 25% fill factor. A digital display having only 25% fill factor will produce an image having black areas between pixels, but the jogging system of the instant invention helps to reduce or eliminate these black areas. If the digital display has 100% fill factor, then you may jog with 25% exposure at each of four positions, or not jog at all, and expose for 100% at one position. For purposes of clarity the following embodiments will describe only one embodiment having ¼ exposure time at each of four jog positions. Although, any combination of jogs or no jogs will work, however, the jogging method produces better pictures regardless of the fill factor of the digital display.

The source file providing the data to be displayed on the digital display 12 should match the desired final resolution of the image. In the following "four jog" first embodiment, a 1200×1600 source image file is equally divided into a first, second, third and fourth image sub-files, each containing 600×800 pixels of data. The first image sub-file may be obtained by picking the intersection of every odd column and every odd row from the source image file. The second image sub-file may be obtained by picking the intersection of every even column and odd row. The third image sub-file may be obtained by picking the intersection of every even column and even row. The fourth image sub-file may be obtained by picking the intersection of every odd column and even row. The order of selecting files may be different, as long as the transposable lens 18 matches the position of the selected pixels when printing.

Therefore, for each jog position, each pixel of the digital display 12 exposes a distinct image sub-file. This jogging and multi-exposure method increases the resolution of the printed image because the number of pixels of data that are imaged onto the image plane 20 are greater than the number of pixels on the digital display 12. For example, as illustrated in FIG. 4 and 5, the "four jog" embodiment, doubles the resolution of the image because there are two times as many pixels imaged onto the photosensitive medium, in both the x and y directions, than there are pixels on the digital display 12. The transposable lens 18 is jogged between four locations, or "jog positions" and the image is fully exposed after four separate partial exposures at each jogged position.

To facilitate the discussion, the operation of a first "four jog" embodiment of the jogging system of the instant invention will first be described, as shown in FIG. 4, in terms of only one pixel 13 on the digital display 12. The first step involves loading pixel one 13, of the digital display 12, with a first image sub-file of data. Then, while the transposable lens 18 is in a first jog position, exposing pixel one 13 onto a first pixel imaged location 21 of the image plane 20. This first pixel imaged location 21 is also shown at A1 of FIG. 5, which shows a broken away section of the image plane 20 of FIG. 4. In this first embodiment, the image plane 20 is defined by a photosensitive medium. The duration of this first exposure is for one quarter of the total exposure time of the photosensitive medium, and then the power to the pixel is turned off.

A next step is jogging the transposable lens 18 in the positive x-axis 52 direction, to a second jog position. In this first embodiment, the distance of each jog is approximately the distance of one half a pixel length. For example, to move a projected microdisplays image approximately ½ a pixel on the image plane 20 may require the transposable lens 18 to be jogged approximately 0.006 inches and the resulting image shift, or jog, being about 0.00025 inches. Once the transposable lens 18 is in the second jogged position, pixel one 13 is loaded with a second image sub-file of data. Then, while the transposable lens 18 is in this second jog position, exposing pixel one 13 onto a second pixel imaged location 23 of the image plane 20, as shown at A2 of FIG. 5. The duration of this second exposure is for one quarter of the total exposure time of the photosensitive medium, and then the power to the pixel is turned off.

A next step is jogging the transposable lens 18 in the negative y-axis 54 direction, to a third jog position. Pixel one 13 is loaded with a third image sub-file of data. Then, while the transposable lens 18 is in this third jog position, exposing pixel one 13 onto a third pixel imaged location 25 of the image plane 20, as shown at A3 of FIG. 5. The duration of this third exposure is for one quarter of the total exposure time of the photosensitive medium, and then the power to the pixel is turned off.

A last step of this jogging system is jogging the transposable lens 18 in the negative x-axis 52 direction, to a fourth jog position. Pixel one 13 is loaded with a fourth image sub-file of data. Then, while the transposable lens 18 is in this fourth jog position, exposing pixel one 13 onto a fourth pixel imaged location 27 of the image plane 20, as shown at A4 of FIG. 5. The duration of this fourth exposure is for one quarter of the total exposure time of the photosensitive medium, and then the power to the pixel is turned off.

The aforementioned jogging process simultaneously occurs for every pixel of the digital display 12, so that in effect, the finished image on the image plane 20 has twice as many pixels as the digital display 12. For example, imaging a 800×600 pixel digital display, using this jogging process, will produce an image with a resolution of 1600×1200. Although, this first embodiment of the jogging system uses 4 jog positions, this jogging process works with any number of jogging positions, depending on the desired resolution of the image. For example, more solenoids and linkages may be used to achieve more lens positions. Alternatively, a cam wheel having multiple steps in conjunction with various linkage arrangements may be used to transpose a lens to many jogged positions. A cam wheel may be powered by a DC motor or stepper motor or other type of motor known in the arts. Also, the first jog step may be in the negative y-axis direction 54 or any other direction. These jogging principles work for any jog directions and/or order of movements.

The device lever arms pivot at such a location, so that movement at the lever arm first end 26 is de-amplified at the second end 30. In one example, moving the linear motion device 24 0.060 inches will move the first end 26 of the linear motion device 24 0.060, but the second end 30 of the first lever 28 will only move 0.004 inches. The location of the fixed supports, and length of the lever arms may be easily changed to provide for any desired amount of movement de-amplification. This de-amplification of movement provides for more forgiving tolerances and therefore allows the use of less expensive low force linear motion control devices which result in higher forces at the lens end of the lever arms.

Although the first and second embodiment of the device 22 only move the lens in the x-axis 52 or y-axis 54 planer directions, alternatively the device 22 may be jogged in 45 degree angles or other angles. Also, in other embodiments, the amount that the pixel image is jogged may be any fixed amount, for example, 1/10 or 1/3 a pixel length, depending on the desired number of pixels per unit area. Accordingly, the duration of each exposure is also intelligently adjusted depending on the total number of jogging positions used for each exposure.

The instant invention is an inexpensive and accurate means of improving resolution when imaging a digital display 12 onto a photosensitive medium. The following paragraphs describe some of the advantages of this system.

As understood in the art, when you increase the dots per inch (dpi) or pixels per inch of a digital display, the resolution of the resulting digital image is increased. To obtain a higher resolution from a given digital display, such as a 600×800, one solution is to purchase a digital display 12 with more greater dots per inch, but this is expensive. A less expensive means is to use the jogging system of the instant invention to increase the dots per inch. For example, imaging onto a 4×5 inch photosensitive medium using a 600×800 display, with out a jogging system, yields approximately 160 dots per inch (dpi). However, using the device 22 in a "four jog" mode in the same printer, and onto the same size media, yields approximately 320 dpi. The cost of two small solenoids, two levers and a spring are very low; and, these parts are easy to manufacture and inspect. The entire device 22 may be added external to a projection lens, and therefore not affect the internal projection system which typically must be carefully sealed and free from dust, moisture and movement.

Imaging using this jogging system produces a "smoothing" effect on the image, so that there is no discernable pixel structure in the image when viewed under an eye loop. This effect is especially noticeable along an edge, for example, along the edges of a black letter "O" against a white background. Smoothing occurs because the jagged edges or "stair case effect" is minimized by increasing the dpi, which decreases the size of each "jagged edge" or stair, making the edges less noticeable. A second reason why the "jagged edges" are less noticeable is because there is less sharpness along the edges of the steps because the exposure times are reduced with the jogging method. Therefore, the edge of pixel image will go from medium to low exposure with the jogged system, so that there is not as sharp a contrast. Contrariwise, the edge of the pixel image, with the unjogged system, will go from high to low exposure. Although a slight blurring effect may occur from jogging, various edge enhancement techniques, such as edge sharpening or masking, may be used to offset this effect and further increase the image quality.

If an image capture device, the digital display 12 or the image plane 20 are jogged, then a very expensive and precise jogging mechanism is required to prevent undesirable rotation of the image on the image plane 20. However, using a lens as the device 22 eliminates problems associated with rotation during jogging. If the lens is rotated while being jogged, then the image is not affected. Therefore, the device 22 for a lens does not have to be as precise and is therefore less expensive.

If the image capture device, the digital display 12, or the image plane 20 are jogged, then the device 22 must also be precisely designed to ensure there is accurate and consistent movements of the device. For example, in one specifically sized LCD embodiment, if you desire to jog the image about one half a pixel, and you are going to jog the first lens 16, you may need to move the first lens 16 about 6 microns, with a tolerance of plus or minus 2 microns. Different sized pixels would change the amount of transposable lens 18 movement required for a movement of ½ a pixel. In any case, these movements are very small. For example, a human hair is about 100 microns. Therefore, these small movements require sophisticated and expensive equipment to repeatably accomplish these moves. Alternatively, if you desire to jog the image this same one half a pixel, but you are going to jog the weaker transposable lens 18, you may need to move the transposable lens 18 about 60 microns. It is easier to repeatably and accurately move a lens 60 microns, using less sophisticated and expensive equipment, than would be required to move a lens 6 microns.

Another reason that this invention may be manufactured inexpensively is that the lever arm/fulcrum design of the device 22 de-amplifies the movements of the control device, which allows the use of control devices with lower tolerances. For example, in one embodiment, the movement of the second end 30 of the first lever 28 is de-amplified by approximately 15 times, and therefore a linear movement error at the first end 26 of the first lever 28 of 0.003, may be translated to be only a 0.0002 inch movement at the second end 30 of the first lever 28 which attaches to the transposable lens 18. Therefore, this lever system is more forgiving of less accurate, and less expensive, linear control device, such as inexpensive solenoids.

Another feature of the instant invention is that the jogging system can image a digital file that has a higher resolution than the digital display 12. In other words, if the digital file has higher resolution than the digital display 12 is able to display at one time, the jogging system of the instant invention enables you to image all of the data, by doing multiple exposures, each with different data.

Another advantage of using the jogging system of the instant invention is that it is a less expensive means of jogging than tipping a plate in the optical path. Although tipping a plate allows for easy to control tolerances, it must be done in a collimated light path. This would require a high quality and expensive telecentric lens system that would have to be located in the telecentric zone between the lens and the imager. Also, this area between the lens and the imager is a dust sensitive area, and moving parts in this area may cause dust problems.

What is claimed is:

1. A method of imaging a digital display onto an image plane, said method comprising the steps of:

a) providing a digital display, a plurality of lenses, and an image plane onto which a photosensitive medium may be superposed, said digital display, said plurality of lenses, and said image plane are spaced along an optical axis extending from said digital display through said plurality of lenses, and toward said image plane such that a digital image provided by said display can be brought into focus onto said image plane by said plurality of lenses, and one of said plurality of lenses is a transposable lens, said transposable lens capable of being transposed out of said optical axis during the operation of a printer;

b) illuminating said digital display with a first digital image data set for a fixed period of time, turning off said digital display;

c) transposing said transposable lens a fixed distance, in a first direction;

d) illuminating said digital display for a second fixed period of time, using a second digital image data set, turning off said digital display; and e) whereby said method of imaging increases the perceived resolution of the digital image focused onto said image plane.

2. The method of claim 1 wherein a photosensitive medium defines said image plane.

3. The method of claim 1 wherein said digital display is a microdisplay.

4. The method of claim 1 wherein said digital display is a liquid crystal display.

5. The method of claim 1 wherein said fixed distance is a distance being less than the width of one pixel of said digital display.

6. The method of claim 5 wherein said fixed distance is equal to one half of the width of a pixel on said digital display.

7. The method of claim 1 further including transposing said transposable lens said fixed distance for a second time, and using a third digital image data set to illuminate said digital display for a third period of time, turning off said digital display.

8. The method of claim 7 wherein said transposing said transposable lens for a second time is in a second direction, which is different from said first direction.

9. The method of claim 8 further including transposing said transposable lens said fixed distance for a third time, and using a fourth digital image data set to illuminate said digital display for a fourth fixed period of time, turning off said digital display.

10. The method of claim 9 wherein said first, second, third and fourth fixed periods of time are a portion of said photosensitive medium's total exposure time.

11. The method of claim 9 wherein said transposing said transposable lens for a third time is in a third direction, which is different from said first and second directions.

* * * * *